UNITED STATES PATENT OFFICE.

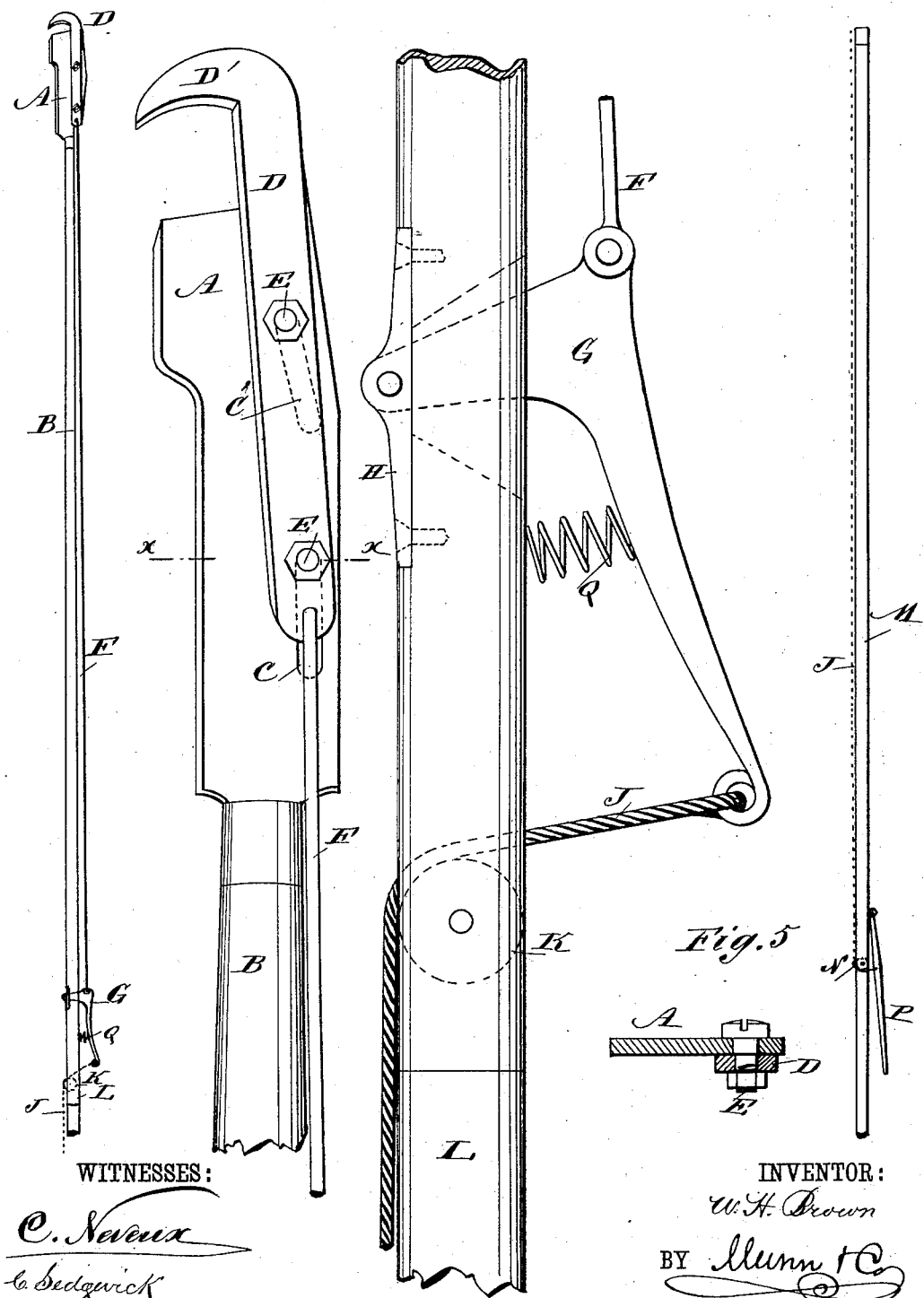

WILLIAM H. BROWN, OF DUNEDIN, FLORIDA.

PRUNING IMPLEMENT.

SPECIFICATION forming part of Letters Patent No. 336,694, dated February 23, 1886.

Application filed November 5, 1885. Serial No. 181,918. (No model.)

*To all whom it may concern:*

Be it known that I, WILLIAM H. BROWN, of Dunedin, county of Hillsborough, Florida, have invented a new and Improved Pruning Implement, of which the following is a full, clear, and exact description.

The object of my invention is to provide a new and improved implement for pruning, cutting, and trimming trees, shrubs, bushes, &c.

The invention consists in the construction and arrangement of parts, as will be hereinafter fully described and claimed.

Reference is to be had to the accompanying drawings, forming part of this specification, in which similar letters of reference indicate corresponding parts in all the figures.

Figure 1 is a side view of my improved pruning implement. Fig. 2 is a side view of the handle part. Fig. 3 is an enlarged side view of the cutting device. Fig. 4 is an enlarged side view of the lever for operating the cutting device; and Fig. 5 is a sectional plan view on the line $x\ x$, Fig. 3.

The chisel A is secured on the upper end of a pole, B, and is provided with a longitudinal slot, C, and with a slot, C', above the slot C, and slightly inclined to the same. A hook, D, having a cutting-edge at the bottom of its prong D', is arranged to slide on the side of the chisel A, and is guided by screw-bolts E, passed through the slots C C' and the hook, and held in place by nuts. A rod, F, is connected with the lower end of the hook, and the lower end of the said rod is connected with an angle-lever, G, at the angle of the said lever. One shank of the lever G is passed through a slot in the pole B and pivoted to a clip, H, on the pole. The other end of the lever G is connected with a cord, J, passed through a slot in the pole and over a pulley, K, in the said slot.

A ferrule, L, on the lower end of the rod B, serves to receive the upper end of an extension-rod, M, near the lower end of which a pulley, N, is arranged, over which the lower part of the cord J passes, the end of the cord being secured to a lever, P, pivoted on the extension-rod. A spring, Q, presses the lower part of the lever G outward or from the pole.

The cutting-edge of the chisel A is placed against the branch, &c., to be cut, and the lever P is swung from the rod M, whereby by means of the cord J the lower part of the lever G is moved toward the rod B. Thereby the hook D is pulled downward, but as it is guided by the inclined slot C' it is also moved slightly toward the edge of the chisel, and a shearing cut is thus made. When the lever P is released, the spring Q presses the lower end of the lever G outward, and thereby raises the hook D.

If desired, the upper rod, B, only may be used, and the implement operated by pressing the lever G toward the rod B by hand direct.

Having thus described my invention, I claim as new and desire to secure by Letters Patent—

As an improved article of manufacture, a pruning implement consisting of the handle B, the chisel A, rigidly secured to the upper end thereof and having the inclined slot C' and the straight slot C below the same, the sliding hook D, projecting above the chisel-edge, the screws E E, extending through the hook and the slots C' C, the angle-lever G, pivoted at the end of its horizontal arm to the handle, the rod F, pivoted to the angle of the lever and to the lower end of the hook, the pulley K, below the angle-lever, and the operating-cord J, substantially as set forth.

WILLIAM H. BROWN.

Witnesses:
J. H. HOLMES,
JAMES SOMERVILLE.